United States Patent Office 3,503,737
Patented Mar. 31, 1970

3,503,737
PROCESS FOR THE SEPARATION OF Al AND Si
Gilbert S. Layne and James O. Huml, Midland, Mich., and Richard D. Smith, Madison, Conn., assignors to The Dow Chemical Company, Midland, Mich., a corporation of Delaware
No Drawing. Filed Feb. 24, 1967, Ser. No. 618,348
Int. Cl. C22b *21/06, 5/04*
U.S. Cl. 75—63          7 Claims

ABSTRACT OF THE DISCLOSURE

A process for the separation of aluminum and silicon from one another by contacting the mixture with $Al_2S_3$ at a temperature sufficient to produce gaseous SiS and removing the SiS from the molten aluminum. Likewise silicon or aluminum may be separated from the usual impurities contained therein by reacting the aluminum or silicon with $Al_2S_3$ at a temperature sufficient to form gaseous $Al_2S$ or SiS which are removed leaving the impurities as a residue.

BACKGROUND OF THE INVENTION

This invention relates to a process for the separation of aluminum and silicon from metallic mixtures thereof and more particularly relates to a process for the separation of aluminum and silicon from one another and simultaneously from the impurities normally occurring therein.

SUMMARY OF THE INVENTION

It is an object of this invention to provide a process whereby silicon can be separated from an aluminum-silicon alloy by removing the silicon as SiS, a gas, from the molten aluminum. It is an additional object of this invention to provide a process whereby purified aluminum and silicon may be recovered from mixtures thereof and from usual impurities contained therein. It is a further object of this invention to provide a method to produce metallic aluminum from $Al_2S_3$ while simultaneously separating silicon from an aluminum-silicon mixture or alloy. These and other objects and advantages of the process will be readily appreciated and better understood by reference to the following detailed description.

BRIEF DESCRIPTION OF PREFERRED EMBODIMENTS

It has now been discovered that aluminum and silicon may be separated and recovered from mixtures thereof and from mixtures containing the usual impurities by first contacting such mixture, at a temperature at least equal to the vaporization temperature of SiS at the pressure employed, with sufficient $Al_2S_3$ to react with the silicon present. If the mixture or alloy thus treated contains only aluminum and silicon, at least a portion of the silicon will be removed as gaseous SiS leaving a purified liquid aluminum. For example, the reaction at atmospheric pressure of an alloy containing an equimolar ratio of aluminum and silicon can be illustrated by the following equation:

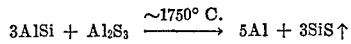

$$3AlSi + Al_2S_3 \xrightarrow{\sim 1750°\ C.} 5Al + 3SiS \uparrow$$

As shown by the equation, 60% of the aluminum produced was derived from the alloy and 40% from the $Al_2S_3$ reactant. The gaseous SiS thus produced may be used as a reactant in this gaseous form, may be cooled and collected as a solid product consisting of an equimolar mixture of Si and $SiS_2$ or may be converted to metallic silicon.

It is readily appreciated that the above equation illustrates the ideal and theoretical separation achieved by a single stage reaction of $Al_2S_3$ with the aluminum-silicon mixture. It has been found, however, that while a single stage distillation employing the stoichiometric proportion of $Al_2S_3$ will produce separation of silicon from the aluminum, the separation is not complete in a single stage. Some $Al_2S$ is apparently formed together with the SiS but a separation into two fractions is obtained. One fraction contains a higher proportion of silicon than the original alloy and one contains a higher proportion of aluminum than the original alloy. Separation and enrichment of the two components has occurred, however, and the two fractions thus obtained may then each be again reacted with $Al_2S_3$ and distilled to further purify them. Alternatively, the product gas from the original reaction may be rectified to produce a purified product. About six theoretical plates will produce a substantially complete separation of the silicon and the aluminum.

As many aluminum-silicon alloys contain other impurities, particularly carbon and heavy metals such as iron, titanium, copper and nickel, it is usually desirable, after the first stage separation of the silicon, to also remove the aluminum from the original alloy or mixture. Aluminum separation is achieved, after the desired silicon separation is complete, by contacting the remaining molten alloy, at a temperature at least equal to the vaporization temperature of $Al_2S$ at the pressure employed, with sufficient $Al_2S_3$ to react with the aluminum present. Aluminum reacts with $Al_2S_3$ to form $Al_2S$ which passes as a gas from the residual alloy. Upon cooling to below its volatilization temperature, $Al_2S$ disproportionates to form aluminum metal and $Al_2S_3$ which may be recycled to the zone of reaction. At atmospheric pressure, the following equations are thought to illustrate the reactions involved:

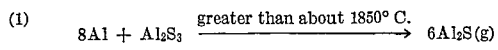

(1) $\quad 8Al + Al_2S_3 \xrightarrow{\text{greater than about } 1850°\ C.} 6Al_2S(g)$

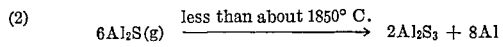

(2) $\quad 6Al_2S(g) \xrightarrow{\text{less than about } 1850°\ C.} 2Al_2S_3 + 8Al$ The impurities normally contained in the alloy are unaffected by the reaction and remain in the reaction zone as a residue, therefore a single stage reaction and distillation will substantially completely remove the aluminum and any remaining silicon. The aluminum and $Al_2S_3$ are readily separated and the $Al_2S_3$ is then available for recycle to the reaction zone.

Pressure is not a critical variable in the operation of this process. As increasing pressure increases the temperature of volatilization of the gaseous products of this process, no advantage is gained by employing a pressure substantially in excess of atmospheric. If a lower volatilization temperature is desired, a reaction pressure below atmospheric may be employed. It is usually most convenient, however, to employ a pressure at or near atmospheric.

Due to the relative temperatures of vaporization of SiS and $Al_2S$, it is necessary in this process to first remove silicon from the alloy. The temperature at which SiS vaporizes is dependent upon the concentration of silicon in the alloy being treated. For instance, SiS vaporizes at atmospheric pressure from an 80 weight percent Si-20 weight percent Al alloy at about 1550° C. Under the same conditions SiS vaporizes from a 50 weight percent Si-50 weight percent Al alloy at about 1750° C. The temperature of vaporization may, of course, be raised or lowered by increasing or decreasing the pressure on the reaction system.

In order to achieve optimum silicon removal from an aluminum and silicon containing alloy, it is desirable to employ at least a stoichiometric quantity of $Al_2S_3$. Amounts in excess of the stoichiometric amount are not detrimental, particularly if the aluminum is likewise to be recovered by volatilization as the sulfide. An excess of $Al_2S_3$ may also serve as a flux to protect the molten aluminum in the reaction zone.

The $Al_2S_3$ reactant may be prepared outside of the system and added thereto as necessary, or it may be generated in situ by the addition of sulfur or a sulfide reactive with Al or Si to form aluminum or silicon sulfides. Preferably elemental sulfur, $H_2S$ or $SiS_2$ are employed. Sulfur will react rapidly and somewhat exothermically with the aluminum in the alloy to produce $Al_2S_3$.

It is desirable to conduct this process in an inert atmosphere. At the temperatures employed, the reactants are all subject to oxidation in the presence of air. The presence of oxides of carbon are likewise to be avoided. These react with the molten aluminum to produce $Al_2S_3$ and carbon. An atmosphere of a chemically inert gas such as argon is preferred.

Heating of the reaction zone may be conducted by electrical means such as by resistance, induction and the like.

In order to provide ease in understanding, the following examples are set forth to illustrate the invention but are not to be construed to limit the scope thereof.

Example 1

A series of experiments were conducted as follows:

A graphite crucible (insulated from and contained by a quartz shell) containing 200 gm. of $Al_2S_3$ and 150 gm. of an aluminum-silicon alloy containing from 80 to 20 mole percent silicon was placed in an induction heating coil. The temperature within the graphite crucible was raised to 1800° K. (1527° C.) as measured by a thermocouple in a central thermowell within the crucible. As distillation from the crucible occurred, the partial pressures of both SiS and $Al_2S$ in the off gas were determined in order to demonstrate the separation of the silicon and the aluminum as the composition of the molten alloy in the crucible changed. The results were as follows:

| Mole Fraction of Al in the crucible | Partial pressure of SiS in mm. of Hg | Partial pressure of $Al_2S$ in mm. of Hg |
|---|---|---|
| 0.2 | 600 | 4.0 |
| 0.3 | 340 | 6.0 |
| 0.4 | 200 | 8.8 |
| 0.5 | 118 | 12.8 |
| 0.6 | 69 | 18 |
| 0.7 | 35 | 25 |
| 0.8 | 16 | 32 |

Example 2

A graphite crucible (insulated from and contained by an evacuated quartz shell) containing 100 grams of an 80 weight percent Si-20 weight percent Al alloy was placed in an induction heating coil. The temperature of the alloy was raised to 1550° C. and $H_2S$ was admitted into the reactor. The $H_2S$ reacted with the alloy, producing a readily condensible distillate. This condensate was subsequently analyzed and found to consist of equimolar quantities of $SiS_2$ and Si, the condensation products of SiS. $H_2$ was also released as a non-condensible product. Within ½ hour, the $H_2S$ was substantially completely reacted and the atmosphere surrounding the crucible was composed essentially of hydrogen.

Example 3

In the manner of Example 2, 150 grams of $Al_4C_3$ was mixed with an equal weight of $Al_2S_3$ in a graphite crucible and the crucible was heated in an induction furnace. At a temperature of about 2070° C. and one atmosphere of argon pressure the mixture began to boil. The partial pressure of $Al_2S$ above the crucible was about 540 mm. Hg while that of $Al_2S_3$ was about 220 mm. Hg. The condensate from this reactor contained Al and $Al_2S_3$ as the principal products.

Various modifications can be made in the present invention without departing from the spirit or scope thereof for it is understood that we limit ourselves only as defined in the appended claims.

We claim:
1. A process for the separation of aluminum and silicon from mixtures thereof which comprises
   (1) contacting said aluminum-silicon mixture with $Al_2S_3$ at a temperature sufficient to produce gaseous silicon sulfide, and
   (2) distilling gaseous silicon sulfide from said mixture to produce a purified molten aluminum.
2. The process of claim 1 wherein the $Al_2S_3$ is first formed in situ by adding sulfur or a sulfide reactive with aluminum and silicon to the aluminum-silicon mixture at a temperature below the volatilization temperature of SiS.
3. The process of claim 1 wherein the $Al_2S_3$ is formed in situ by adding sulfur or a sulfide reactive with aluminum and silicon to the aluminum-silicon mixture at a temperature above the volatilization temperature of SiS.
4. A process for the separation of aluminum and silicon from mixtures thereof which comprises
   (1) contacting said aluminum-silicon mixture at a temperature of at least 1400° C. and above the volatilization temperature of SiS at the pressure employed with sufficient $Al_2S_3$ to react with the silicon contained therein, and
   (2) distilling the gaseous SiS thus formed from said mixture to produce a purified molten aluminum.
5. A process for the separation of aluminum and silicon from mixtures thereof with heavy metals which comprises
   (1) contacting said mixture in a reaction zone at a temperature at least equal to the vaporization temperature of SiS at the pressure employed with at least a stoichiometric amount of $Al_2S_3$ based on the silicon present,
   (2) distilling the gaseous SiS from the reaction zone,
   (3) contacting the remaining mixture at an increased temperature which is at least equal to the volatilization temperature of $Al_2S$ at the pressure employed with $Al_2S_3$,
   (4) distilling gaseous $Al_2S$ therefrom and
   (5) producing aluminum and $Al_2S_3$ by cooling the gaseous $Al_2S$ below its vaporization temperature.
6. The process according to claim 5 wherein the pressure is substantially atmospheric.
7. The process according to claim 6 wherein the temperature for vaporization of the SiS is at least 1550° C. and the temperature for vaporization of $Al_2S$ is at least about 1850° C.

References Cited

UNITED STATES PATENTS

| | | | |
|---|---|---|---|
| 1,982,959 | 12/1934 | Kuhlmann | 75—63 |
| 2,301,360 | 11/1942 | Brennan | 75—63 X |
| 3,396,012 | 8/1968 | Huml | 75—63 X |

OTHER REFERENCES

Wartenberg: Article in Zeit. Anorg. v. Allgem. Chem., vol. 286, September 1956, pp. 247–253.

HENRY W. TARRING II, Primary Examiner

U.S. Cl. X.R.

23—223.5; 75—27, 62, 68, 89